US012493420B2

United States Patent
Wang (10) Patent No.: US 12,493,420 B2
(45) Date of Patent: Dec. 9, 2025

(54) CONFIGURING DATA IN POWER MANAGEMENT INTEGRATED CIRCUIT BASED ON CIRCUIT BOARD ARCHITECTURE TYPE IN A DISPLAY PANEL

(71) Applicants: Huizhou China Star Optoelectronics Display Co., Ltd., Huizhou (CN); TCL China Star Optoelectronics Technology Co., Ltd., Shenzhen (CN)

(72) Inventor: Kai Wang, Huizhou (CN)

(73) Assignees: Huizhou China Star Optoelectronics Display Co., LTD., Guangdong (CN); TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/623,561

(22) PCT Filed: Dec. 15, 2021

(86) PCT No.: PCT/CN2021/138188
§ 371 (c)(1),
(2) Date: May 25, 2023

(87) PCT Pub. No.: WO2023/087454
PCT Pub. Date: May 25, 2023

(65) Prior Publication Data
US 2024/0045600 A1 Feb. 8, 2024

(30) Foreign Application Priority Data

Nov. 18, 2021 (CN) .......................... 202111368522.3

(51) Int. Cl.
G06F 3/06 (2006.01)

(52) U.S. Cl.
CPC .......... *G06F 3/0625* (2013.01); *G06F 3/0655* (2013.01); *G06F 3/0679* (2013.01)

(58) Field of Classification Search
None
See application file for complete search history.

(56) References Cited

U.S. PATENT DOCUMENTS

2009/0303227 A1* 12/2009 Hwang ................ G09G 3/2055
345/214
2012/0057082 A1* 3/2012 Dunn ...................... H04N 21/00
348/739

(Continued)

FOREIGN PATENT DOCUMENTS

| CN | 101154247 A | 4/2008 |
| CN | 103927566 A | 7/2014 |

(Continued)

OTHER PUBLICATIONS

Chinese Office Action issued in corresponding Chinese Patent Application No. 202111368522.3 dated Jan. 30, 2024, pp. 1-8.

(Continued)

*Primary Examiner* — Danny Chan
(74) *Attorney, Agent, or Firm* — PV IP PC; Wei Te Chung (57) ABSTRACT

A method and architecture for configuring data in a power management integrated circuit (PMIC), and a display panel are disclosed. By means of the method for configuring data, the times of rewriting reading and loading module code for architectures of different models are reduced. A same configuration format is used for each reading and loading module model, facilitating porting of the storage module or the reading and loading module into different models. For different models, only the configuration information is required to be rewritten, and the reading and loading module (Continued)

performs corresponding actions according to the corresponding settings, facilitating the control of products.

16 Claims, 5 Drawing Sheets

(56) References Cited

U.S. PATENT DOCUMENTS

| | | |
|---|---|---|
| 2018/0322848 A1* | 11/2018 | Wu .......................... G09G 5/00 |
| 2019/0346818 A1 | 11/2019 | Chung et al. |
| 2020/0103998 A1 | 4/2020 | Fan |
| 2021/0065641 A1* | 3/2021 | He ....................... G09G 3/3655 |
| 2021/0200181 A1* | 7/2021 | Ikeda ................. G05B 19/4183 |
| 2021/0335205 A1* | 10/2021 | Li ........................... G09G 3/20 |

FOREIGN PATENT DOCUMENTS

| | | |
|---|---|---|
| CN | 107680554 A | 2/2018 |
| CN | 109712555 A | 5/2019 |
| CN | 110471811 A | 11/2019 |
| CN | 110890076 A | 3/2020 |
| CN | 111786872 A | 10/2020 |
| CN | 112086078 A | 12/2020 |
| WO | 2021072806 A1 | 4/2021 |
| WO | 2021208782 A1 | 10/2021 |

OTHER PUBLICATIONS

International Search Report in International application No. PCT/CN2021/138188, mailed on Aug. 16, 2022.

Written Opinion of the International Search Authority in International application No. PCT/CN2021/138188, mailed on Aug. 16, 2022.

* cited by examiner

CONFIGURING DATA IN POWER MANAGEMENT INTEGRATED CIRCUIT BASED ON CIRCUIT BOARD ARCHITECTURE TYPE IN A DISPLAY PANEL

CROSS-REFERENCE TO RELATED APPLICATION

This application is a national phase application under 35 U.S.C. § 371 of PCT Application No. PCT/CN2021/138188, filed Dec. 15, 2021, which claims priority to Chinese Application No. 202111368522.3, filed Nov. 18, 2021, the contents of which are incorporated herein by reference in their entirety.

FIELD OF INVENTION

The present disclosure relates to the field of display technologies, and in particular, to a data and architecture for configuring data in a power management integrated circuit (PMIC), and a display panel.

BACKGROUND OF INVENTION

In a display panel driving circuit, data is required to be configured in a power management integrated circuit (PMIC). The configuration data of the PMIC is mainly stored in a control board flash memory of a control board (C-Board), a driving board flash memory on a driving board (X-Board), or an electrically erasable programmable read-only memory (EEPROM) on the driving board (X-Board). Current display devices (models) mainly have two architectures, a separated architecture in which the X-Board and the C-Board are separated and a combined architecture in which the X-Board and the C-Board are combined. For the combined architecture, only a C-Board Flash is present, and a timing controller (TCON) configures data in the C-Board Flash to the PMIC. For the separated architecture, the TCON preferentially configures the data in the X-Board Flash or the X-Board EEPROM to the PMIC.

When the TCON is used in a different model, data of which memory (C-Board Flash, X-Board Flash, or EEPROM) is required to be selected according to an architecture type of a current model for loading, and a storage address of PMIC data in the memory is changed according to a size of the memory. Therefore, lots of modifications are required during preparation of TCON code for a different model. In addition, a different type of PMIC brings a different device address and a different register address of the PMIC. Therefore, the TCON code is required to be modified accordingly. In case of a larger quantity of models, maintenance of the TCON code is complex.

SUMMARY OF INVENTION

Technical Problem

Embodiments of the present disclosure provide a method and architecture for configuring data in a power management integrated circuit (PMIC) and a display panel, to resolve the difficulty in porting TCON code into different models.

Technical Solution

The embodiments of the present disclosure provide a method for configuring data in a PMIC. The method includes following steps:

reading configuration information to determine a circuit board architecture type;
loading PMIC configuration data; and
configuring the loaded PMIC configuration data to the PMIC.

Optionally, the step of reading the configuration information to determine the circuit board architecture type further includes: determining whether the circuit board architecture type is a separated architecture; and if a determination result is no, determining that the circuit board architecture type is a combined architecture.

Optionally, the step of reading the configuration information to determine the circuit board architecture type further includes: determining whether the circuit board architecture type is a separated architecture; and if a determination result is yes, determining that the circuit board architecture type is the separated architecture.

Optionally, the step of reading the configuration information to determine the circuit board architecture type further includes: determining a type of a driving board storage module according to driving board storage module type information in the configuration information.

Optionally, the step of reading the configuration information to determine the circuit board architecture type further includes: checking a change of the configuration information and/or the PMIC configuration data according to a cyclic redundancy check (CRC) value in the configuration information.

The embodiments of the present disclosure further provide an architecture for configuring data in a power management integrated circuit (PMIC). The architecture includes: a circuit board; a storage module disposed on the circuit board and storing configuration information and PMIC configuration data, wherein the configuration information includes circuit board architecture type information indicating a circuit board architecture type; a reading and loading module disposed on the circuit board and electrically connected to the storage module to read the configuration information and load the PMIC configuration data; and a PMIC disposed on the circuit board and electrically connected to the reading and loading module, wherein the reading and loading module configures the PMIC configuration data to the PMIC to realize the configuration of the data in the PMIC.

Optionally, the circuit board includes a control board and a driving board, and the circuit board architecture type is a combined architecture or a separated architecture.

Optionally, the combined architecture means that the control board and the driving board are combined, the storage module is a control board flash memory, and the configuration information and the PMIC configuration data are stored in at least one sector of the control board flash memory.

Optionally, the separated architecture means that the control board and the driving board are separated, and the storage module includes a control board flash memory disposed on the control board and a driving board storage module disposed on the driving board, the reading and loading module is disposed on the control board, and the control board flash memory and the driving board storage module are electrically connected to the reading and loading module.

Optionally, the configuration information is stored in at least one sector of the control board flash memory, the configuration information includes driving board storage module type information indicating a driving board storage module type, and the PMIC configuration data is stored in the driving board storage module.

The embodiments of the present disclosure further provide a display panel. The display panel includes a power management integrated circuit (PMIC) and the architecture for configuring data in a PMIC as described above. The architecture for configuring data in a PMIC is electrically connected to the PMIC.

Beneficial Effects

The beneficial effects of the present disclosure are as follows: According to the method for configuring data in a PMIC that is provided, the configuration information is stored in the storage module of the circuit board, and after the circuit board is powered on, the reading and loading module reads the configuration information, determines a circuit board architecture type according to the circuit board architecture type information included in the configuration information, loads the PMIC configuration data from the storage module corresponding to the circuit board architecture, and then configures the loaded PMIC configuration data to the PMIC. Therefore, the times of rewriting reading and loading module code for architectures of different models are reduced. A same configuration format is used for each reading and loading module model, facilitating porting of the storage module or the reading and loading module into different models. For different models, only the configuration information is required to be rewritten, and the reading and loading module performs corresponding actions according to the corresponding settings, facilitating the control of products.

BRIEF DESCRIPTION OF DRAWINGS

The following describes specific implementations of the present disclosure in detail with reference to the accompanying drawings, so as to make the technical solutions and other beneficial effects of the present disclosure obvious.

The component numbers in the figure are as follows:
100. Configuration architecture, 110. Circuit board, 111. Control board, 112. Driving board, 1121. Driving board storage module, 120. Storage module, 121, 121'. Driving board flash memory, 130. Reading and loading module, 140. Power management integrated circuit.

DETAILED DESCRIPTION OF PREFERRED EMBODIMENTS

The following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person skilled in the art based on the embodiments of the present disclosure without creative efforts shall fall within the protection scope of the present disclosure.

According to a method for configuring data in a PMIC, configuration information is stored in a storage module of a circuit board, and after the circuit board is powered on, a reading and loading module reads the configuration information, determines a circuit board architecture type according to circuit board architecture type information included in the configuration information, loads PMIC configuration data from a storage module corresponding to the circuit board architecture, and then configures the loaded PMIC configuration data to the PMIC. Therefore, the times of rewriting timing controller (TCON) code for architectures of different models are reduced. A same configuration format is used for each TCON model, facilitating porting of the storage module or a TCON into different models. For different models, only the configuration information is required to be rewritten, and the TCON performs corresponding actions according to the corresponding settings, facilitating the control of products. As a typical application, the method for configuring data in a PMIC is applicable to a display panel, such as a thin film transistor liquid crystal display panel (TFT LCD). Data is configured in a PMIC of the display panel by using the method for configuring data in a PMIC described above. The display panel is applicable to a mobile terminal. The mobile terminal includes a terminal body and a display panel. The mobile terminal may be any product or component having a display function, such as a mobile phone, a tablet computer, a television, a display, a notebook computer, a digital photo frame, or a navigator.

In an embodiment of the present disclosure, the configuration architecture 100 includes a circuit board 110, a storage module 120, and a reading and loading module 130. The storage module 120 is disposed on the circuit board 110. The storage module 120 stores configuration information and PMIC configuration data. The configuration information includes circuit board architecture type information. The reading and loading module 130 is disposed on the circuit board 110. The reading and loading module 130 is connected to the storage module 120. After the circuit board 110 is powered on, the reading and loading module 130 reads the configuration information in the storage module 120 to determine a circuit board architecture type. After determining the circuit board architecture type, the reading and loading module 130 loads the PMIC configuration data from the corresponding storage module.

During data configuration of a PMIC 140, the PMIC 140 is disposed on the circuit board 110 and is electrically connected to the reading and loading module 130, the reading and loading module 130 configures the loaded PMIC configuration data to the PMIC 140, and the PMIC 140 generates, according to the received PMIC configuration data, various operating voltages required for the operation of a display panel (not shown in the figure), such as a digital operating voltage (DVDD) provided to each chip in the display panel, an analog voltage (AVDD) provided to a gamma chip and a VCOM circuit, a turn-on voltage (Vgh or Von) and a turn-off voltage (Vgl or Voff) provided to a gate of a scan driving integrated circuit, and the like.

Figure 1:
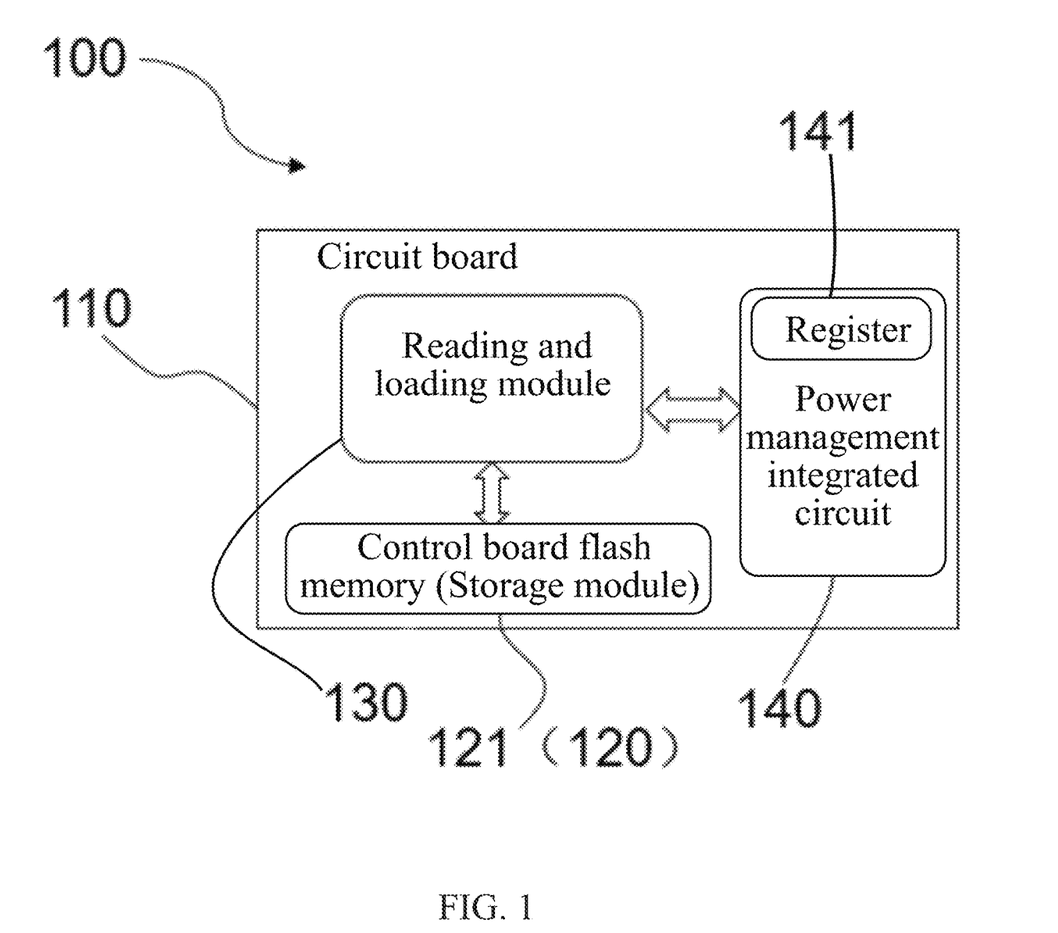
FIG. 1 is a schematic diagram of a structure of a combined architecture.
Figure 2:
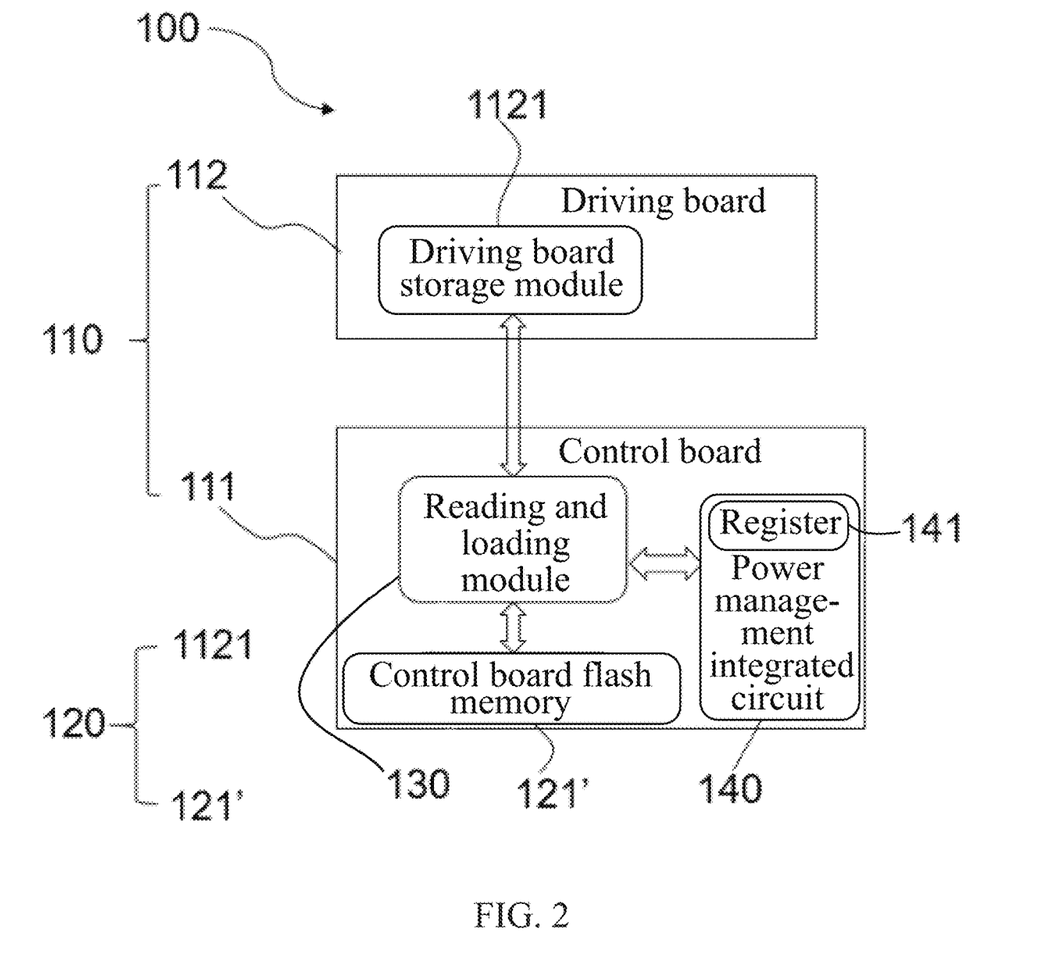
FIG. 2 is a schematic diagram of a structure of a separated architecture.

In some embodiments, the circuit board 110 includes a control board (C-Board) and a driving board (X-Board). The circuit board architecture type is a combined architecture or a separated architecture. Referring to FIG. 1, in the combined architecture, the control board and the driving board are combined to form the circuit board 110, the storage module 120 is a control board flash memory 121 disposed on the circuit board 110, the PMIC configuration data is stored in the control board flash memory 121, and the PMIC 140 is disposed on the circuit board 110. Referring to FIG. 2, in the separated architecture, the control board 111 and the driving board 112 are separated to form the circuit board 110, the storage module 120 includes a control board flash memory 121' disposed on the control board 111 and a driving board storage module 1121 disposed on the driving board 112, the reading and loading module 130 is disposed on the control board 111, the PMIC 140 is disposed on the control board 111, the driving board 112 is connected to the reading and loading module 130 by the driving board storage module 1121, and the PMIC configuration data is stored in the driving board storage module 1121.

The reading and loading module 130 is a chip having a reading function and a data loading function. In the present embodiment, the reading and loading module 130 is a TCON.

In detail, the configuration information is stored at a fixed position in the control board flash memory 121 (121'), for example, in a last sector of the control board flash memory 121 (121'). The configuration information further includes type information indicating a type of the driving board storage module 1121. The type of the driving board storage module 1121 is a driving board flash memory (X-Board Flash) (not shown in the figure) or an electrically erasable programmable read-only memory (EEPROM) (not shown in the figure). The reading and loading module 130 reads the type information, and determines the type of the driving board storage module.

Figure 3:
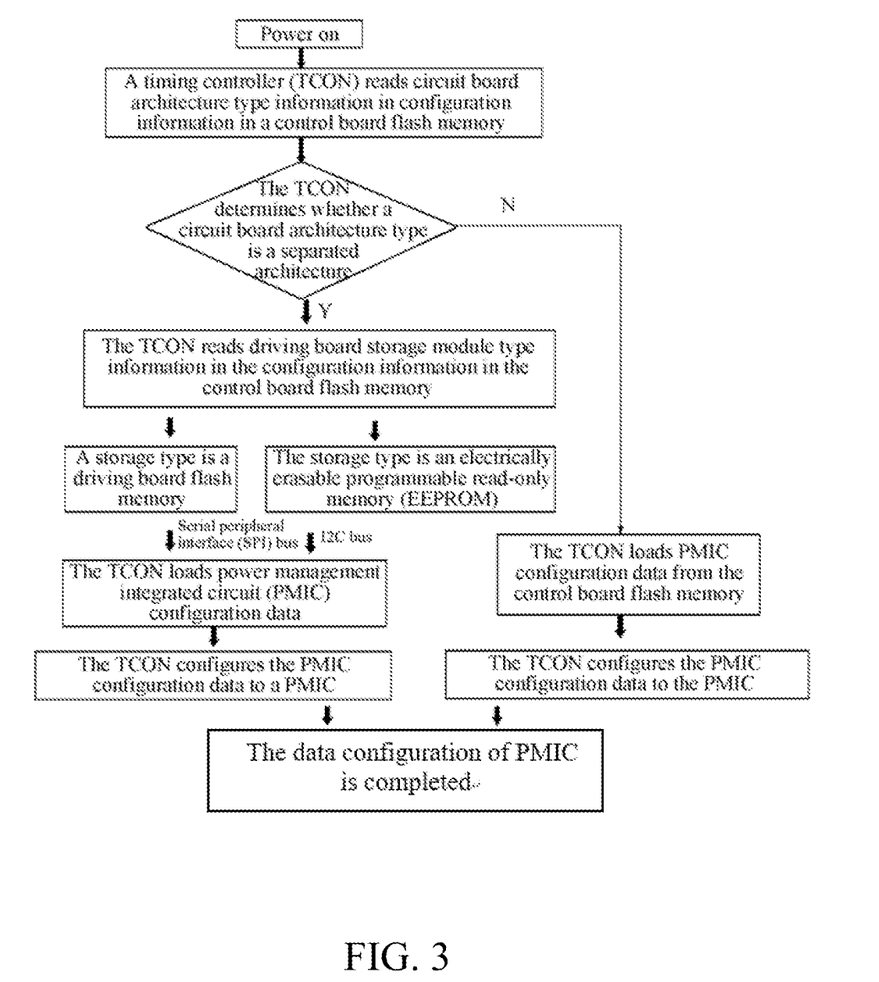
FIG. 3 is a flowchart of a method for configuring data in a power management integrated circuit (PMIC) according to an exemplary embodiment of the present disclosure.

Referring to FIG. 3, a method for configuring data in a PMIC using the configuration architecture 100 provided in the embodiments includes the following steps:

causing the circuit board 110 to be powered on;
reading, by the reading and loading module 130, circuit board architecture type information in configuration information in the control board flash memory 121;
determining, by the reading and loading module 130, whether the circuit board architecture is a separated architecture according to the circuit board architecture type information;
if a determination result of the reading and loading module 130 is no (indicating that the circuit board architecture type is a combined architecture), loading, by the reading and loading module 130, PMIC configuration data from the control board flash memory 121;
configuring, by the reading and loading module 130, the loaded PMIC configuration data to the PMIC 140; and
completing the data configuration of the PMIC 140; or
if the determination result of the reading and loading module 130 is yes (indicating that the architecture type is the separated architecture), reading, by the reading and loading module 130, driving board storage module type information in the configuration information to determine a driving board storage module type;
if the reading and loading module 130 determines that the driving board storage module type is a driving board flash memory, loading, by the reading and loading module 130, second PMIC configuration data from the driving board flash memory by using a serial peripheral interface (SPI) bus;
configuring, by the reading and loading module 130, the loaded second PMIC configuration data to the PMIC 140; and
completing the data configuration of the PMIC 140; or
if the reading and loading module 130 determines that the driving board storage module type is an EEPROM, loading, by the reading and loading module 130, the second PMIC configuration data from the EEPROM by using an I2C bus;
configuring, by the reading and loading module 130, the loaded second PMIC configuration data to the PMIC 140; and
completing the data configuration of the PMIC 140.

Figure 4:
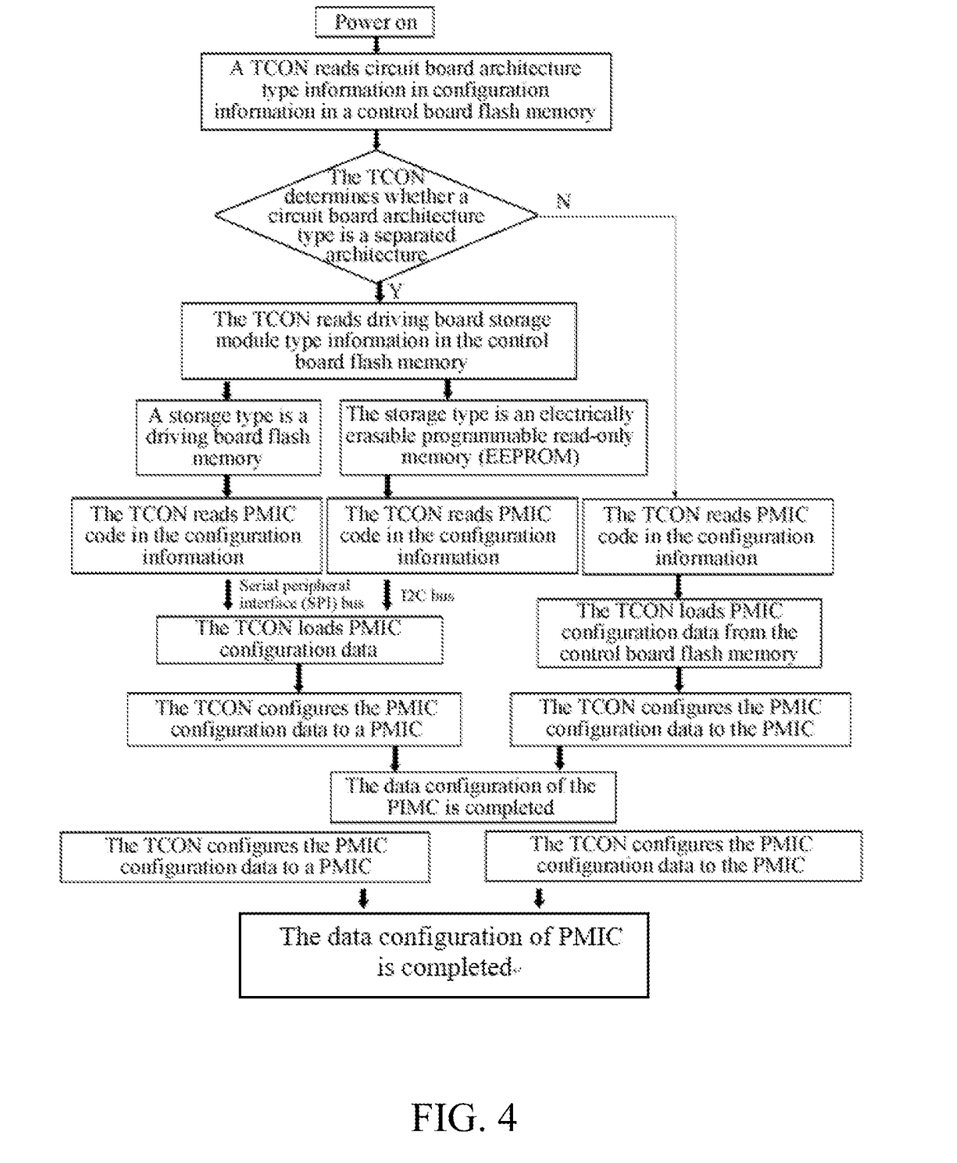
FIG. 4 is a flowchart of a method for configuring data in a PMIC according to an exemplary embodiment of the present disclosure.

As an improvement, referring to FIG. 4, the configuration information further includes PMIC address information and PMIC configuration data length information. The reading and loading module 130 reads the PMIC address information and the PMIC configuration data length information in the configuration information, and generates corresponding PMIC configuration code. Therefore, during the configuration of the loaded configuration data to the PMIC 140, the reading and loading module 130 may configure PMIC configuration data of a corresponding length according to the PMIC configuration code. The PMIC 140 has a register 141 disposed therein, and the reading and loading module 130 configures the generated PMIC configuration code to the register 141.

Figure 5:
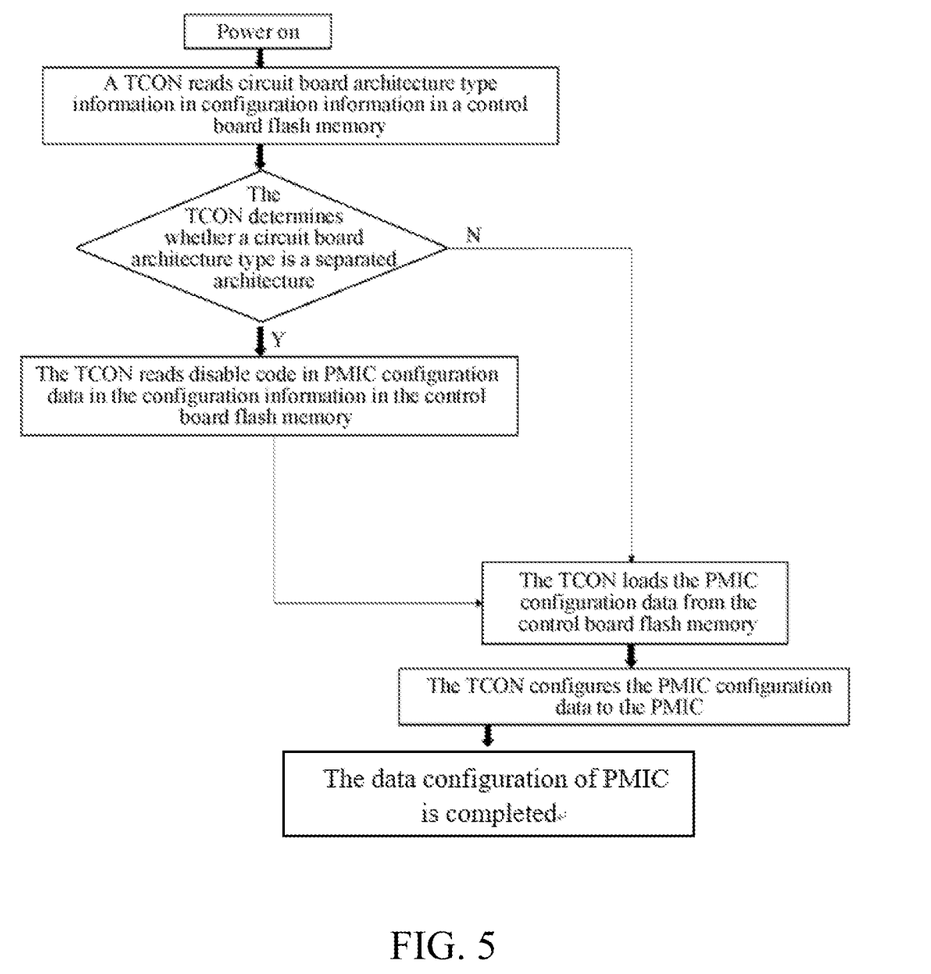
FIG. 5 is a flowchart of a method for configuring data in a PMIC according to an exemplary embodiment of the present disclosure.

As another improvement, referring to FIG. 5, the configuration information further includes PMIC configuration data disable code. If the determination result of the reading and loading module 130 is yes (indicating that the architecture type is the separated architecture), the reading and loading module 130 reads the PMIC configuration data disable code in the configuration information, loads the PMIC configuration data from the control board flash memory 121, and configures the loaded PMIC configuration data to the PMIC 140, to complete the data configuration of the PMIC 140. In the present embodiment, second PMIC configuration data disable code is added to the configuration information. Therefore, when the circuit board architecture type is the separated architecture, the reading and loading module 130 does not load the PMIC configuration data from the driving board storage module 1121. Instead, the reading and loading module reads the PMIC configuration data from the control board flash memory 121, to adapt to the requirements of a different model.

As a preferred manner, the configuration information further includes a cyclic redundancy check (CRC) value used to reflect an information change in the configuration information. When the configuration information and/or the PMIC configuration data is changed, the change may be reflected by the CRC value.

According to the method and architecture for configuring data in a PMIC provided in the present disclosure, the configuration information mechanism is defined, so that the times of rewriting the TCON code for different models are reduced. A same configuration format is used for each TCON model, facilitating porting into different models. For different models, only the configuration information is required to be rewritten, and the TCON performs corresponding actions according to the corresponding settings, facilitating the control of products. A domain of another function selection (such as disable code) may be added to the configuration information to facilitate the maintenance of the configuration information. The model information is reflected in the configuration information, and the CRC value is added to the configuration information. When there is any change in the PMIC data or the type information, the change can be reflected by the CRC value, facilitating the maintenance of the PMIC data and the type information.

In conclusion, although the present application has been disclosed as above in preferred embodiments, the above preferred embodiments are not intended to limit the present application. Those of ordinary skill in the art can make various decisions without departing from the spirit and the scope of the present application. Therefore, the protection scope of the present application is subject to the scope defined by the claims.

What is claimed is:

1. A method for configuring data in a power management integrated circuit (PMIC), comprising following steps:
    reading, by a reading and loading integrated circuit, configuration information from a storage module to determine an architecture type of a circuit board, wherein the configuration information comprises circuit board architecture type information indicating the circuit board is a combined architecture or a separated architecture;
    loading, by the reading and loading integrated circuit, PMIC configuration data according to the architecture type; and
    configuring the loaded PMIC configuration data to the PMIC; and
    generating according to the PMIC configuration data, various operating voltages required for operation of a display panel;
    wherein the reading and loading integrated circuit is a timing controller;
    wherein the configuration information is stored at a fixed position in the storage module.

2. The method for configuring data in a PMIC as claimed in claim 1, wherein
    the step of reading the configuration information to determine the architecture type of the circuit board further comprises following steps:
    determining whether the circuit board is the separated architecture according to the circuit board architecture type information; and
    if a determination result is no, determining that the circuit board is the combined architecture.

3. The method for configuring data in a PMIC as claimed in claim 2, wherein
    the step of reading the configuration information to determine the architecture type of the circuit board further comprises following steps:
    determining whether the circuit board is the separated architecture according to the circuit board architecture type information; and
    if a determination result is yes, determining that the circuit board is the separated architecture.

4. The method for configuring data in a PMIC as claimed in claim 3, wherein
    the step of reading the configuration information to determine the architecture type of the circuit board further comprises a following step:
    determining a type of a driving board storage module according to driving board storage module type information in the configuration information.

5. The method for configuring data in a PMIC as claimed in claim 4, wherein
    the step of reading the configuration information to determine the architecture type of the circuit board further comprises a following step:
    checking a change of the configuration information or the PMIC configuration data according to a cyclic redundancy check (CRC) value in the configuration information.

6. An architecture for configuring data in a power management integrated circuit (PMIC), the architecture comprising:
    a circuit board comprising a control board and a driving board;
    a storage module disposed on the circuit board and storing configuration information and PMIC configuration data, wherein the configuration information comprises circuit board architecture type information indicating the circuit board is a combined architecture or a separated architecture; and
    a reading and loading integrated circuit disposed on the circuit board and electrically connected to the storage module to read the configuration information and load the PMIC configuration data according to the architecture type;
    wherein the PMIC generates according to the PMIC configuration data, various operating voltages required for operation of a display panel;
    wherein the reading and loading integrated circuit is a timing controller;
    wherein the configuration information is stored at a fixed position in the storage module.

7. The architecture for configuring data in a PMIC as claimed in claim 6, wherein the combined architecture means that the control board and the driving board are combined, the storage module is a control board flash memory, and the configuration information and the PMIC configuration data are stored in at least one sector of the control board flash memory.

8. The architecture for configuring data in a PMIC as claimed in claim 6, wherein
    the separated architecture means that the control board and the driving board are separated; and
    the storage module comprises a control board flash memory disposed on the control board and a driving board storage module disposed on the driving board, the reading and loading integrated circuit is disposed on the control board, and the control board flash memory and driving board storage module are electrically connected to the reading and loading integrated circuit.

9. The architecture for configuring data in a PMIC as claimed in claim 8, wherein the configuration information is stored in at least one sector of the control board flash memory;
    the configuration information comprises driving board storage module type information indicating a driving board storage module type; and
    the PMIC configuration data is stored in the driving board storage module.

10. The architecture for configuring data in a PMIC as claimed in claim 9, wherein the driving board storage module type comprises a driving board flash memory and an electrically erasable programmable read-only memory.

11. A display panel, comprising a power management integrated circuit (PMIC) and an architecture for configuring data in a PMIC, wherein the architecture for configuring data in a PMIC is electrically connected to the PMIC and comprises:
    a circuit board comprising a control board and a driving board;
    a storage module disposed on the circuit board and storing configuration information and PMIC configuration data, wherein the configuration information comprises circuit board architecture type information indicating the circuit board is a combined architecture or a separated architecture; and a reading and loading integrated circuit disposed on the circuit board and electrically connected to the storage module to read the configuration information and load the PMIC configuration data according to the architecture type, wherein the PMIC is disposed on the circuit board, and the reading and loading integrated circuit is electrically connected to the PMIC;

wherein the PMIC generates according to the PMIC configuration data, various operating voltages required for operation of the display panel;

wherein the reading and loading integrated circuit is a timing controller;

wherein the configuration information is stored at a fixed position in the storage module.

12. The display panel according to claim 11, wherein a register is disposed in the PMIC, and the reading and loading integrated circuit configures the loaded PMIC configuration data to the register.

13. The display panel according to claim 11, wherein the combined architecture means that the control board and the driving board are combined, the storage module is a control board flash memory, and the configuration information and the PMIC configuration data are stored in at least one sector of the control board flash memory.

14. The display panel according to claim 11, wherein the separated architecture means that the control board and the driving board are separated; the storage module comprises a control board flash memory disposed on the control board and a driving board storage module disposed on the driving board, the reading and loading integrated circuit is disposed on the control board, and the control board flash memory and the driving board storage module are electrically connected to the reading and loading integrated circuit; and the PMIC is disposed on the control board.

15. The display panel according to claim 14, wherein the configuration information is stored in at least one sector of the control board flash memory;

the configuration information comprises driving board storage module type information indicating a driving board storage module type; and the PMIC configuration data is stored in the driving board storage module.

16. The display panel according to claim 15, wherein the driving board storage module type comprises a driving board flash memory and an electrically erasable programmable read-only memory.

* * * * *